United States Patent [19]
Matsumoto

[11] Patent Number: 5,035,564
[45] Date of Patent: Jul. 30, 1991

[54] TRUCK BODY CONSTRUCTION FOR SEPARATE HANDLING OF RE-CYCLABLE REFUSE

[76] Inventor: Tom T. Matsumoto, c/o Sunnyvale Truck Equipment Co. 755 N. Mathilda Dr., Sunnyvale, Calif. 94086

[21] Appl. No.: 390,774

[22] Filed: Aug. 8, 1989

[51] Int. Cl.⁵ .............................................. B65B 21/02
[52] U.S. Cl. .................................. 414/409; 414/487; 298/7; 298/23 R
[58] Field of Search ............... 414/403, 404, 406, 409, 414/486, 487, 537, 512; 296/184; 298/7, 23 R

[56] References Cited

U.S. PATENT DOCUMENTS

| | | | |
|---|---|---|---|
| 2,439,439 | 4/1948 | Abraham | 298/7 |
| 4,113,125 | 9/1978 | Schiller | 414/512 X |
| 4,313,707 | 2/1982 | Bingman et al. | 414/409 |
| 4,492,490 | 1/1985 | Christine et al. | 296/184 X |
| 4,840,531 | 6/1989 | Dinneen | 414/409 |

FOREIGN PATENT DOCUMENTS 3537546 4/1987 Fed. Rep. of Germany ...... 414/512

Primary Examiner—Joseph E. Valenza
Assistant Examiner—Keith L. Dixon
Attorney, Agent, or Firm—Julian Caplan

[57] ABSTRACT

A truck body has at least one vertical, longitudinal divider forming two compartments. Separate chutes are located on the top of the body, one communicating with each compartment so that one particular type of refuse (e.g., paper, aluminum cans and glass) may be dumped into a specific chute to fall by gravity into a compartment. The body may be tilted to shift all refuse to the rear. Each type refuse is discharged through a separate door at the rear. Bins are lifted vertically by hydraulic means to the top of the body and then tilted to dump into chutes. The bins are tucked under the body during transportation to reduce overall width. Further, the bins fan outward to facilitate loading. Wheeled carts filled with refuse may be hooked to the upper edges of the bins so that the carts and bins may be tilted at the upper end of their travel to dump into the chutes.

27 Claims, 8 Drawing Sheets

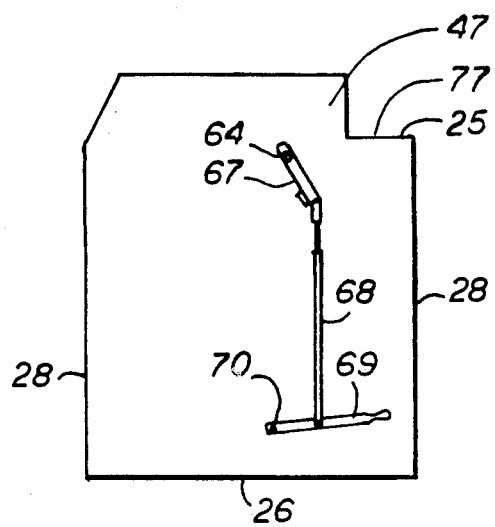
Fig. 18
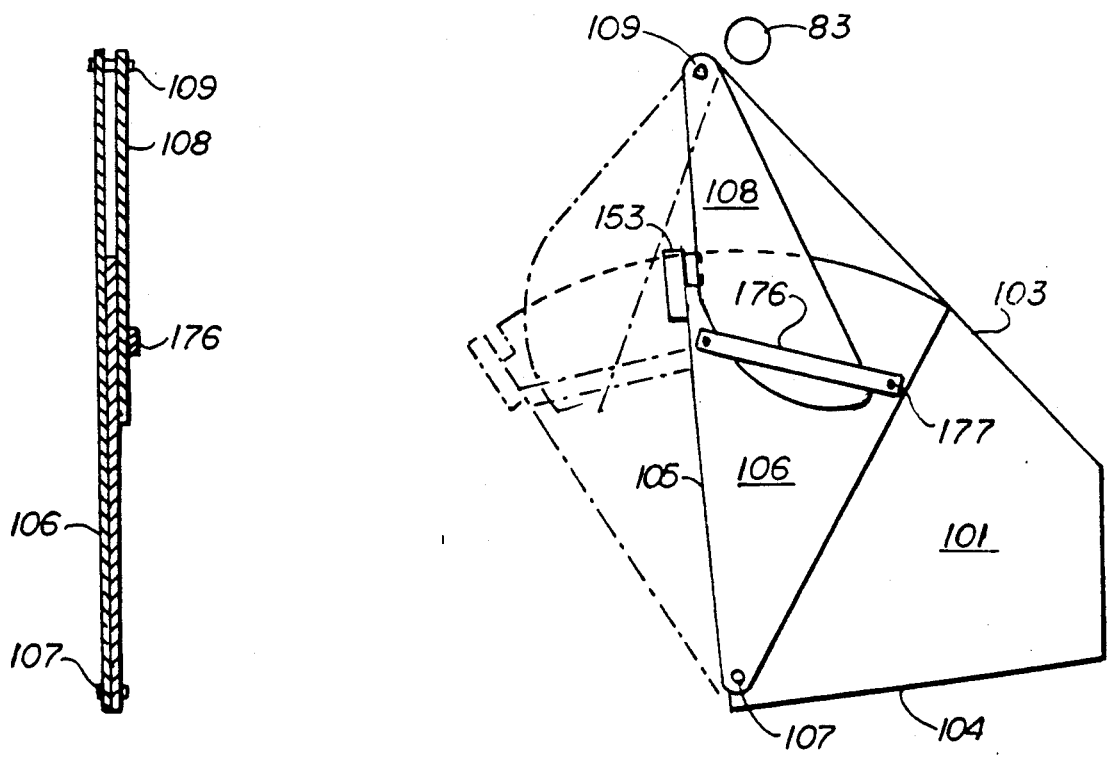
Fig. 20
Fig. 19

TRUCK BODY CONSTRUCTION FOR SEPARATE HANDLING OF RE-CYCLABLE REFUSE

BACKGROUND OF THE INVENTION

1. Field of the Invention

This invention relates to a new and improved truck body construction for separate handling of re-cyclable refuse. More particularly the invention relates to a collection truck body having separate compartments for re-cyclable materials such as paper, glass and aluminum cans. Segregated re-cyclable refuse is loaded into the separate compartments as the truck proceeds along its route and at the end of the trip the compartments are separately unloaded. The invention also relates to a means for hoisting the refuse from ground level to the top of the truck body and dumping the refuse into chutes communicating with the separate compartments. The hoisting mechanism preferably has a bin separated into longitudinally spaced apart bin compartments for the separate types of refuse, each bin communicating with a particular chute for a specific body compartment. Additionally provision is made for hooking collection carts to the bins and securing the carts in place during the dumping process.

2. Description of Related Art

Hoists alongside refuse vehicles are known in the art and are illustrated by such references as U.S. Pats. No. 1,400,543 and 3,136,436. However, the present invention includes many features not shown in the prior art including providing compartmented bins which are permanently attached to the hoist and are tucked under the bottom of the vehicle when the vehicle is traveling along the highway but which are brought into operative position when collections are being made. Further, the present invention provides means for latching wheeled collection carts onto the outside of the bin and securing the carts in place while dumping of the bin is occurring so that the carts and bin are dumped simultaneously.

Compartmentalized truck bodies have been used for transportation of the segregated solids such as different sizes of aggregate, sand and the like. However, the partitions for such bodies have generally extended transversely so that when the bodies are tilted, only the contents of one compartment are shifted. In the present invention, a body may be tilted about a horizontal transverse axis so that the refuse in all of the compartments is shifted rearwardly, permitting additional refuse to be loaded.

SUMMARY OF THE INVENTION

At present, refuse is accumulated by businesses and householders segregated into classes such as paper, glass and metal cans so that the material may be more conveniently recycled. Collection trucks are compartmentalized so that the separated refuse may be loaded into the body. To facilitate this procedure in the present invention, the compartments are defined by vertical longitudinal partitions running from the front toward the rear of the body. Longitudinally spaced chutes at the top of the truck communicate with each of the compartments, the chutes having slanted bottoms so that the refuse when loaded from one or both sides of the truck slides in its particular chute and thence to the proper compartment. The body is mounted on its chassis for tilting about a horizontal transverse axis at the rear of the truck. Hence periodically the body may be tipped so that the refuse slides toward the rear. When the truck is full, separate doors open each of the compartments permitting the contents to be handled in such manner that the contents may be segregated into separate piles for separate recycling.

A hoist is provided on one or both sides of the vehicle. Each hoist moves a bin divided into compartments corresponding in longitudinal position to the location of the chutes at the top of the body. The bins are hydraulically moved from ground position to the top of the body and then hydraulically tilted to dump the contents into a chute corresponding in position to the compartment in the bin. When the truck is proceeding along a highway, a feature of the invention is the fact that the bin is tucked under the side of the body and tucked below the body so that the overall width of the vehicle is not increased by reason of the use of the bins. The outside of the bin is hinged so that it pivots outward, permitting the compartments of the bin to be loaded while the bin is in down or transport position. Thus the ends of the bins and the partitions which divide it into compartments are likewise hinged and preferably formed of overlapping leaves so that the partitions as well as the outside of the bin may be hinged outward from transport to loading position.

Refuse is frequently accumulated in wheeled carts which may be dumped into compartments of the bin. However, a feature of the invention is the fact that a cart may be hooked onto the bin and elevated, tilted and dumped simultaneously therewith.

BRIEF DESCRIPTION OF THE DRAWINGS

The accompanying drawings, which are incorporated in and form a part of this specification, illustrate embodiments of the invention and, together with the description, serve to explain the principles of the invention:

FIGS. 2A, 3A and 4A are views of a modification similar to FIGS. 2, 3, 4 and 5 respectively.

FIG. 5A is a view similar to FIG. 5 of the modification of FIGS. 2A—4A.

FIG. 18 is an elevational view of the front of the body.

FIG. 19 is a fragmentary sectional view taken substantially along the line 19—19 of FIG. 6.

FIG. 20 is a sectional view taken substantially along the line 20—20 of FIG. 19.

DESCRIPTION OF THE PREFERRED EMBODIMENTS

Figure 1:
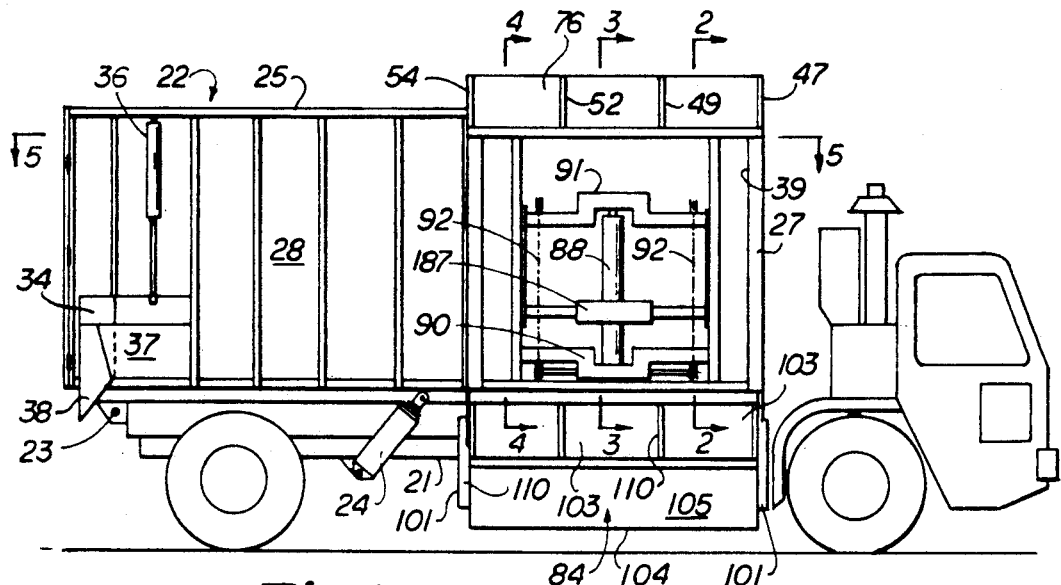
FIG. 1 is a side elevational view of a truck in accordance with the present invention.

Reference will now be made in detail to the preferred embodiments of the invention, examples of which are illustrated in the accompanying drawings. While the invention will be described in conjunction with the preferred embodiments, it will be understood that they are not intended to limit the invention to those embodiments. On the contrary, the invention is intended to cover alternatives, modifications and equivalents, which may be included within the spirit and scope of the invention as defined by the appended claims.

COMPARTMENTS

The truck of the present invention has a chassis 21 on which body 22 is mounted about a horizontal transverse pivot 23 located at the rear of the chassis. Lift cylinder 24 when energized causes the body 22 to pivot about the axis of pivot 23 for the purpose of sliding refuse which has been loaded into the forward end of the body 22 toward the rear thereof.

Body 22 has a top 25, a bottom 26 and a front 27. It also has generally vertical sides 28. Extending vertically longitudinally from the front 27 toward the rear is first longitudinal partition 29. Because paper is generally accumulated in greater quantities than either glass or cans, it is desirable that the central compartment be larger than the other compartments. For such purpose, partition 29 terminates about midway of the length of the body 22 in a rearward outward slanted partition 31 which in turn continues as a rearward extension 32 displaced outwardly relative to partition 29. Partition 32 terminates in an outward-rearward slanted wall 33.

Figure 5:
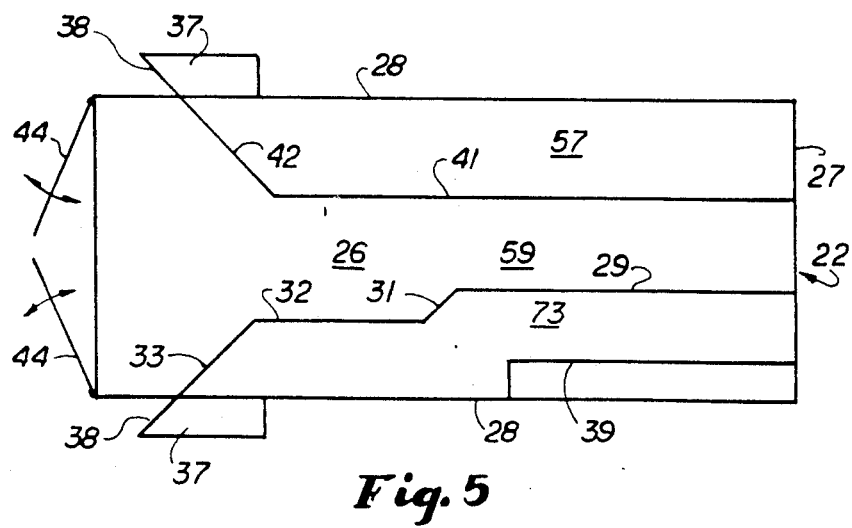
FIG. 5 is a schematic horizontal sectional view taken substantially along the line 5—5 of FIG. 1.

On the exterior of the right side 28 adjacent the rear of the truck is a discharge gate 34 actuated by cylinder 36. Baffle 37 is pivoted to side 28 about a longitudinal horizontal hinge to the lower edge of the side 28. Slightly rearward of baffle 37 is second baffle 38 hinged by a vertical hinge to side 28. The corners of baffles 37 and 38 are at about a 45° angle. When the body 22 is tilted to discharge through the gate 34, the baffles 37 and 38 are folded outward as shown in FIG. 5. The two baffles comprise a chute which discharges the refuse in the compartment outwardly. Slanted wall 33 assists in directing refuse out gate 34.

Either or both sides 28 may be formed at the front of the body 22 with an inset 39 which accommodates the hoisting apparatus hereinafter described.

A second longitudinal partition 41 extends from front 27 rearwardly and terminates in a rearward outward slanted portion 42. The left hand side of the body 22 may be formed with a gate 34 (not shown) actuated by cylinder 36 (not shown) and the left side is provided with hinged baffles 37 and 38 similar in structure and function to the baffles on the right side.

At the back of the body 22 are doors 44 to unload compartment 59 through the rear of the body.

CHUTES

Figure 2:
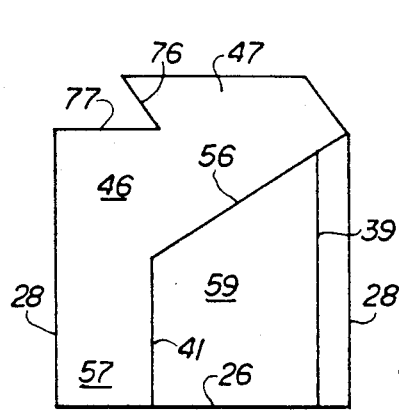
FIGS. 2, 3 and 4 are respectively schematic sectional views taken substantially along the lines 2-2, 3-3 and 4-4 of FIG. 1 respectively.

Directing attention now to FIG. 2, body 22 is formed with a forward transverse chute partition 46 having an upward extension 47 coinciding with the front 27. Similarly there is a first intermediate transverse chute partition 48 having an upward extension 49, a second intermediate transverse chute partition 51 having an upward extension 52 and a rear transverse partition 53 having upward extension 54. Slanted chute bottom 56 slants from the top of right body side 28 downward between partitions 46 and 48 through top 25, it being understood that the lower edges of partitions 48 and 51 terminate at the level of the lower edge of bottom 56 to communicate with third compartment 57 between left side 28 and partitions 41, 42. Chute bottom 56 also functions as a top for compartment 73. Back 76 prevents refuse from falling off the opposite side of the truck and top 77 closes off the top of compartments 57. Slanted chute bottom 58 extends from the top of right side 28 between the partitions 48 and 51 downward through top 25 to partition 29 thereby communicating with second compartment 59 which is centrally disposed between the right side partition portions 29-31-32-33 and the left side partitions 41-42.

Extending across the top of compartment 59 mounted on the upper ends of transverse chute partitions 48 and 51 are approximately horizontal oppositely-facing channels 61. Slideable in channels 61 are rollers 62. Frame members 66 carrying canvas extend between the rollers 62 and up to hinge 63 and then down to shaft 64. Directing attention now to FIG. 18, shaft 64 extends out through the front 27. Affixed to shaft 64 is lever 67 and pivotably connected thereto is link 68 which extends down to about the midpoint of handle 69 pivoted to pivot 70.

Figure 3:
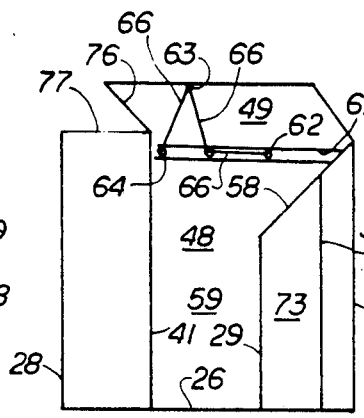
Figure 4:
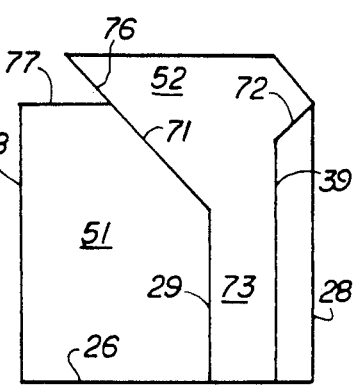

It is desirable to cover the upper end of compartment 59 since paper tends to fly out of the compartment when the truck is proceeding along the highway. Directing attention to FIG. 18, the handle 69 is shown in transport position. When the handle 69 is raised, shaft 64 is turned in a counterclockwise direction. Directing attention now to FIG. 3, turning shaft 64 in a counterclockwise direction causes the canvas frame members 66 to move to the left permitting loading of the compartment 59.

Slanted chute bottom 71 extends from the top inner edge of extension 52 downwardly and toward the right between the extensions 52 and 54 terminating at the top of partition 29. A downward slanted top 72 for inset 39 extends from the top of right side 28 to the top of inset 39. Thus is defined the first compartment 73 which is defined by the inner wall of the inset 39 and the right side 28 on the one hand and the partitions 29-31-32-33 on the other.

Body 22 is divided into longitudinal compartments 57, 59 and 73. Each compartment is provided with an individual chute, the chutes being spaced from the front 27 rearwardly in the vicinity of the inset 39. As the compartments are filled at the front of the truck, it is occasionally necessary to tilt the body 22 by actuating cylinder 24. This causes the refuse to slide toward the rear, permitting more refuse to be loaded at the front.

HOIST

Mounted on either end of inset 39 is an inward facing channel 81 which extends from the top of body 22 downward vertically to near bottom 26 where it has an inward/downward slanted portion 82. Horizontal shaft 83 pivotably supports bin subsection 84. Upper and lower longitudinal lift reinforcements 87 extend between the channels 81.

Figure 6:
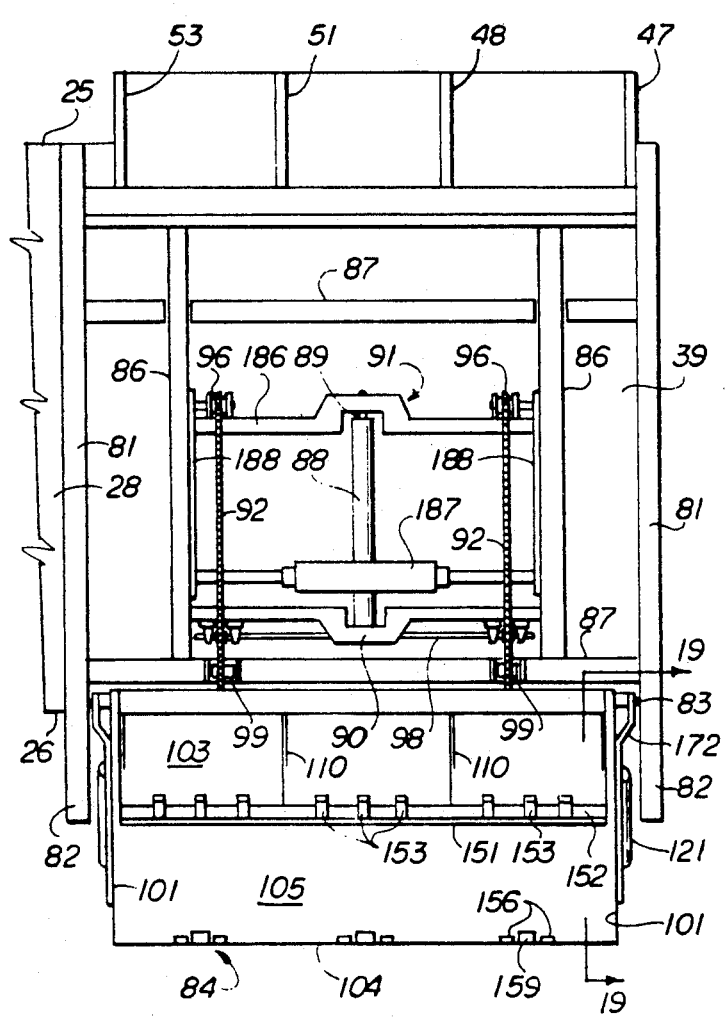
FIG. 6 is an enlarged side elevational view of the hoist in down position.
Figure 7:
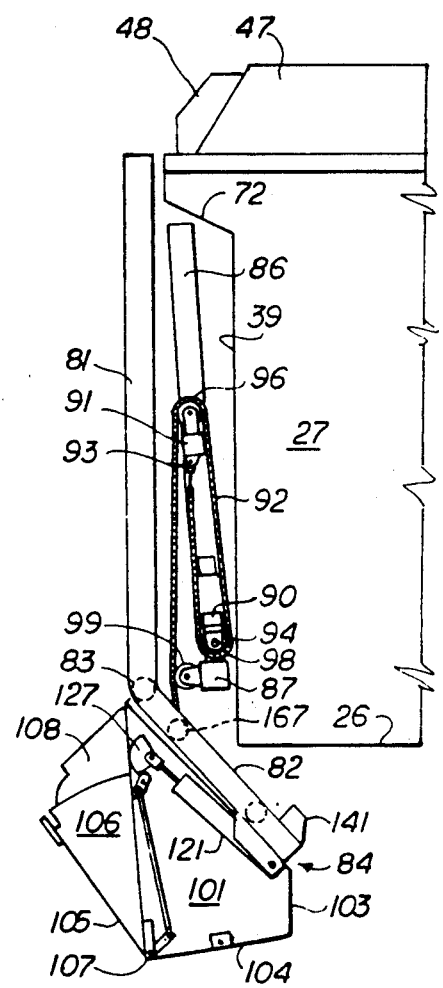
FIG. 7 is a side elevational view of the structure of FIG. 6.
Figure 6A:
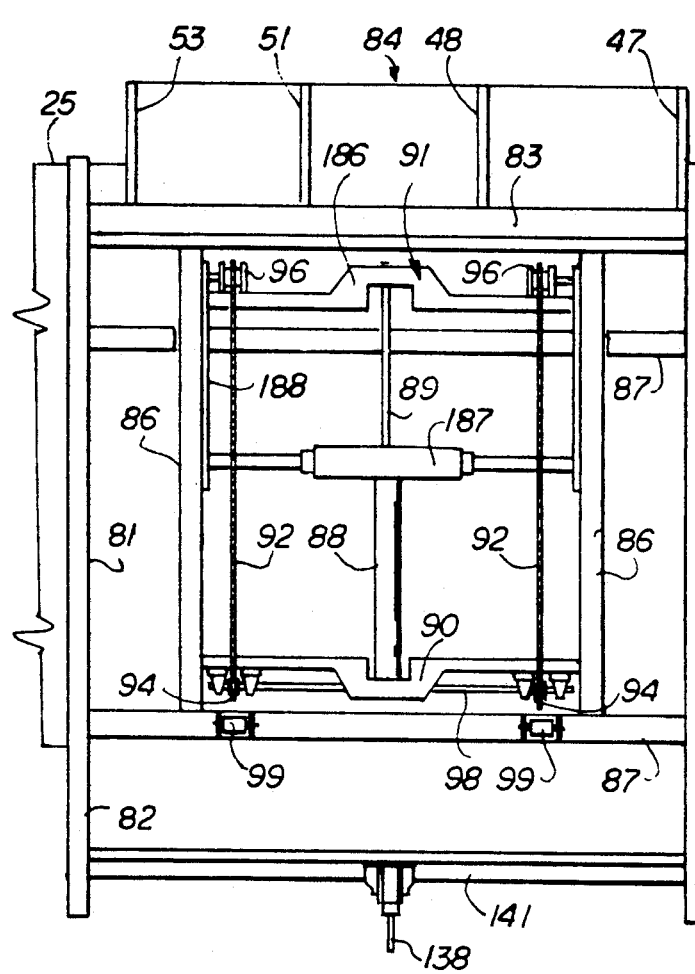
FIG. 6A is a view similar to FIG. 6 showing the hoist in up position with certain parts removed to reveal internal construction.

The hoist portion itself is mounted within the inset 39 and consists of two vertical inward facing lift side channels 86 which are parallel to channels 81 but spaced inwardly relative thereto. Vertical hydraulic cylinder 88 is supported at its lower end by support 90. The rod 89 extending out of the top of the cylinder 88 is connected to crosshead 91. Crosshead 91 comprises a vertical frame defined by top, bottom and side members 186, 187, 188. Members 188 slide in channels 86. Chains 92 spaced inwardly relative to the channels 86 have first anchors 93 anchoring the same to the lower surface of the top of crosshead 91. The chains 92 run down from the crosshead 91 and around lower sheaves 94 rotatably mounted on lower reinforcement 87, thence upwardly around upper sheaves 96 mounted on cross head 91 and thence down to second anchors 97 to longitudinal horizontal cross member 166 which is part of the bin subsection 84. There are chains 92 on each side of the hoist. To maintain synchronism in rotation of sheaves 94, both are fixed to a common longitudinal horizontal shaft 98 and this assures that both sides of the hoist move at the same rate. The arrangement of the chain sheaves is such that for each unit of extension of rod 89 there is a three unit movement of cross member 166. With particular reference to FIGS. 6 and 7 guide rollers 99 engage the lower ends of chain 92 and support the chain away from the sides of the body 22.

The frame for bin subsection 84 comprises upper and lower horizontal longitudinal frame members 166, 167 and vertical members 168 welded thereto. Rollers 102 are rotatably connected to member 168 and slide in channels 81-82. Pivot shaft 83 is rotatable in the upper ends of vertical members 168.

BIN

Figure 7A:
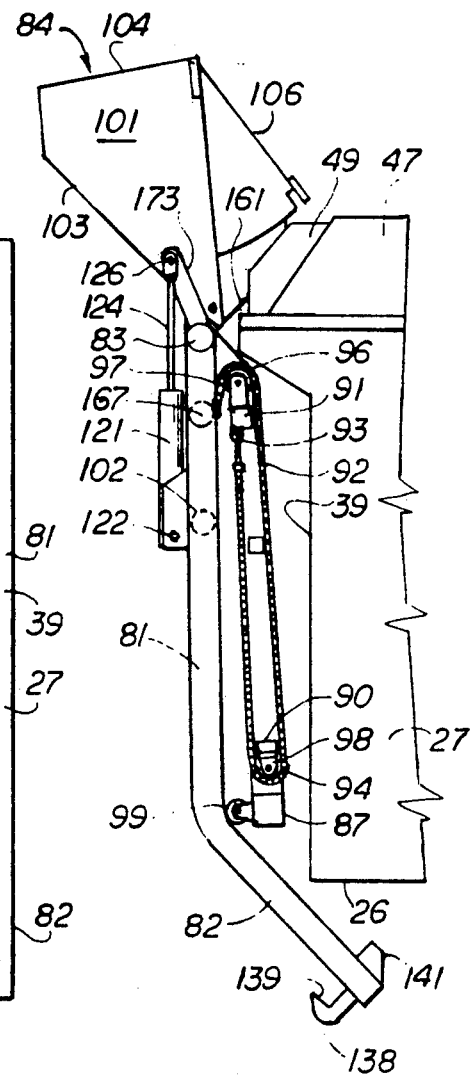
FIG. 7A is a side elevational view of the structure of FIG. 6A showing the bin in dumping position.
Figure 8:
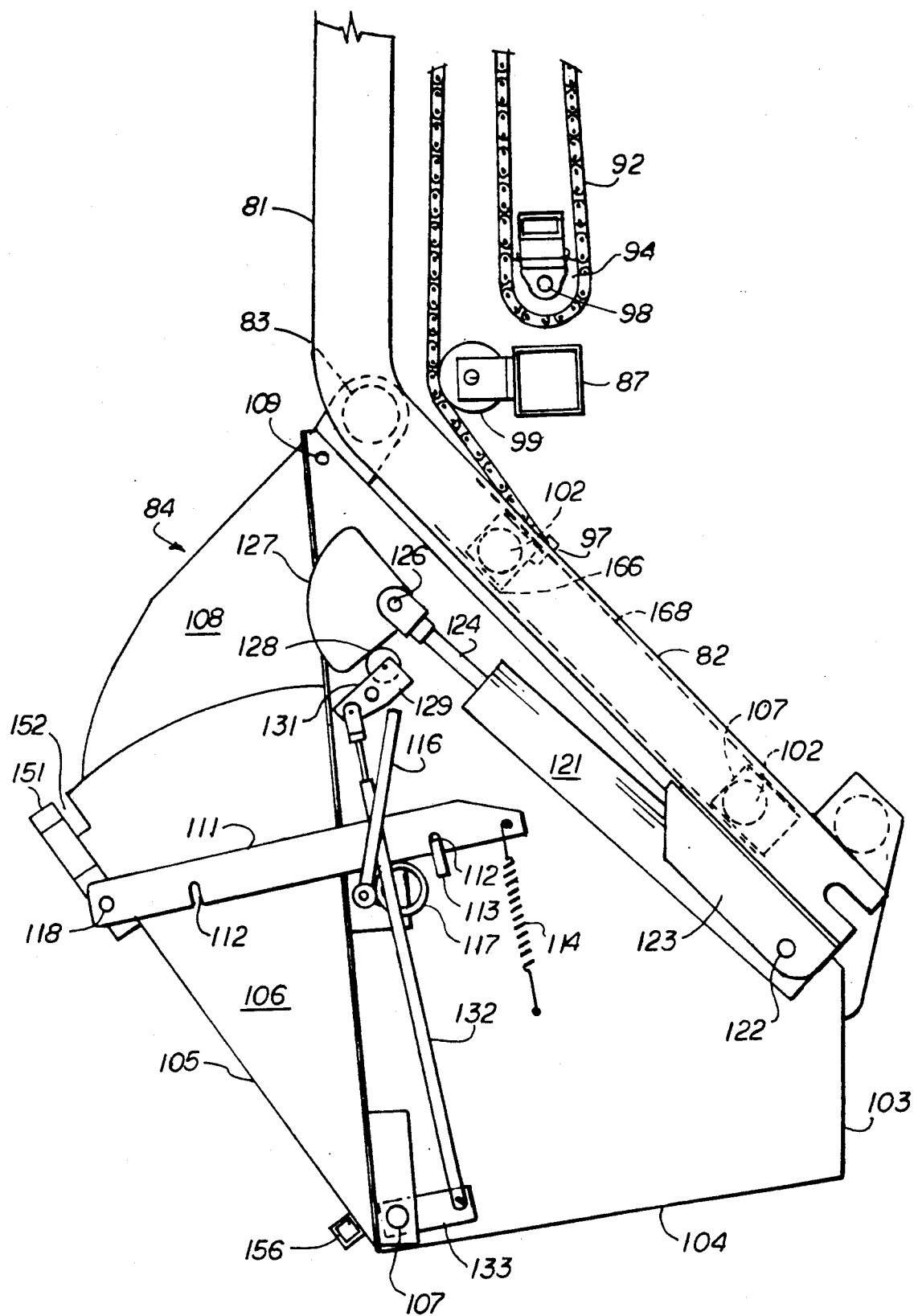
FIG. 8 is an enlarged fragmentary side elevational view of the bin and its supporting structure in down position.

Bin subsection 84 has front and back outer sides 101, an angular back 103 best shown in FIG. 7A and a bottom 104. Front 105 extends part way up bin subsection 84 and is pivoted to sides 101 at pivot axis 107 (see FIG. 8). Immediately inward of sides 101, front 105 has an outer leaf 106 pivoted about pivot 107 and pivotable therewith is inner leaf 108 which is pivoted by means of pivot 109 to the upper forward corner of side 101. When the front 105 is pulled outward (as hereinafter explained) the space between front 105 and the forward edge of side 101 is closed off by the combination of leaves 106 and 108 pivoting outward to the position of FIGS. 8 and 19. It will be understood that leaves 106, 108 are on both the forward and rear end of the bin. Furthermore, vertical transverse bin partitions 110 divide the length of bin 105 into three parts and that there are leaves (not shown) similar to leaves 106 and 108 associated with each of the partitions 110.

Directing attention to FIGS. 19 and 20, second outer leaf 108 is held against leaf 106 by strap 176. Strap 176 is riveted by rivet 177 to leaf 106 and its outer end is affixed to front 105. When front 105 is pulled outward, the rivet 177 contacts the inner edge of second leaf 108, causing the leaf 108 to swing outward (counterclockwise as shown in FIG. 19). When the front 105 is closed, the front 105 contacts the outer edge of leaf 108, causing it to fold inward.

Outward pivotal movement of front 105 is controlled by latch bars 111 on either side of the bin formed with inner and outer notches 112 on their undersides. Affixed to each side 101 is a latch 113 which can fit into either of the notches 112. Latch bar 111 is biased into engagement with latch 113 by spring 114. Latch release lever 116 is pivoted to side 101 and is fixed to latch lifter 117 which bears against the underside of bar 111. Hence by pulling lever 116 forward (counterclockwise), the bar 111 is lifted so that the notches 112 are not engaged by latch 113. This permits manual opening and closing pivotal movement of front 105. Although not shown in the accompanying drawings, there is a latch bar 111 on each side of the bin subsection 84 and to ensure the two latch bars raise and lower together, their outer ends are fixed to longitudinal horizontal pivot rod 118 which is pivotably mounted on the front 105. When the front 105 is extended as in FIG. 8, the latch 113 is seated in inward notch 112. When it is desired to close the front 105, the lever 116 is pulled forward causing the lifter 117 to raise the lever 111 and pivot rod 118. The front 105 is then pushed inward until the latch 113 seats in the outer notch 112.

TILT MECHANISM

Hydraulic dump cylinder 121 is pivoted at its lower end by pivot 122 to support 123 fixed to bin subsection side frame member 168. Rod 124 of cylinder 121 is fixed to pivot 126 which is pivotably mounted between the arms 172 and 173 of clevis 171, the upper end of clevis 171 being pivoted to pivot shaft 83. This movement of rod 124 causes rotation of shaft 83. Bin sides 101 and the upper end of back 103 are fixed to shaft 83. Hence cylinder 121 causes pivotal movement of the bin relative to frame 166-167-168 about the axis of shaft 83.

Between the arms 172, 173 and fixed to pivot 126 is a cam 127. Cam follower 128 is mounted on the outer end of rocker arm 129 pivoted by means of pivot 131 to side 101. Link 132 is connected at its opposite end to one end of lever 133 located adjacent the lower end of side 101, the opposite end of lever 133 being fixed to longitudinal horizontal pivot shaft 107.

As hereinafter appears, when the bin subsection 84 is raised to the top of the body 22 by actuation of cylinder 88, when the cylinder 88 reaches its maximum extension, cylinder 121 is energized, there being a sequential valve controlling both cylinders 88 and 121. Extension of rod 124 causes the bin subsection 84 to pivot about pivot shaft 83, inverting the bin subsection.

Figure 17:
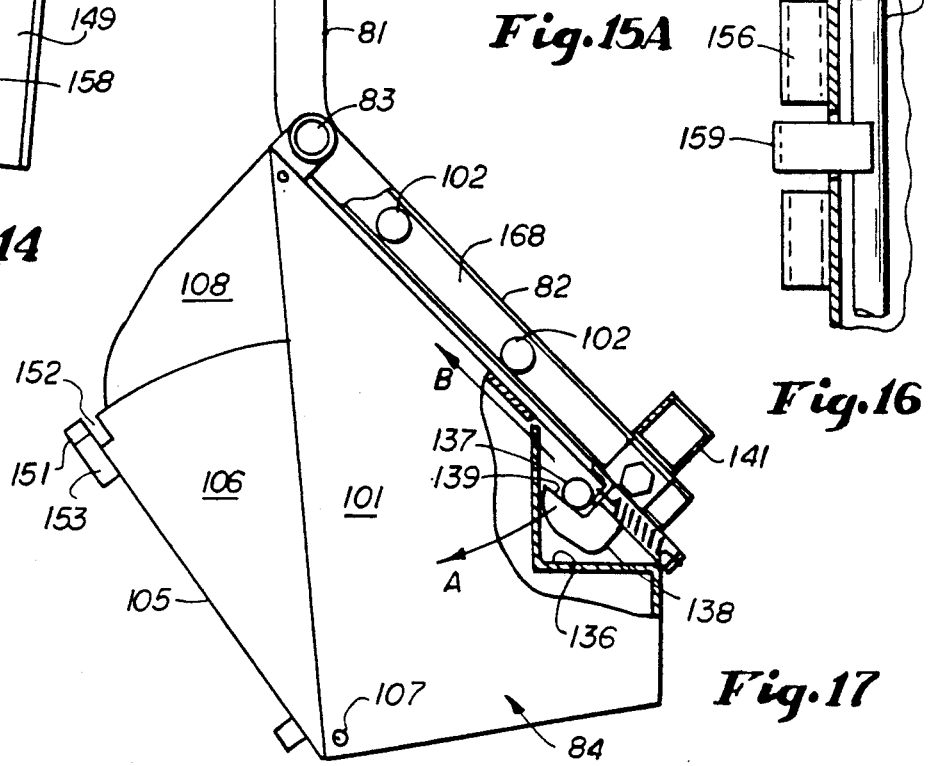
FIG. 17 is an elevational view partially broken away in section to reveal the means whereby the bin is hooked in place for transportation.
Figure 21:
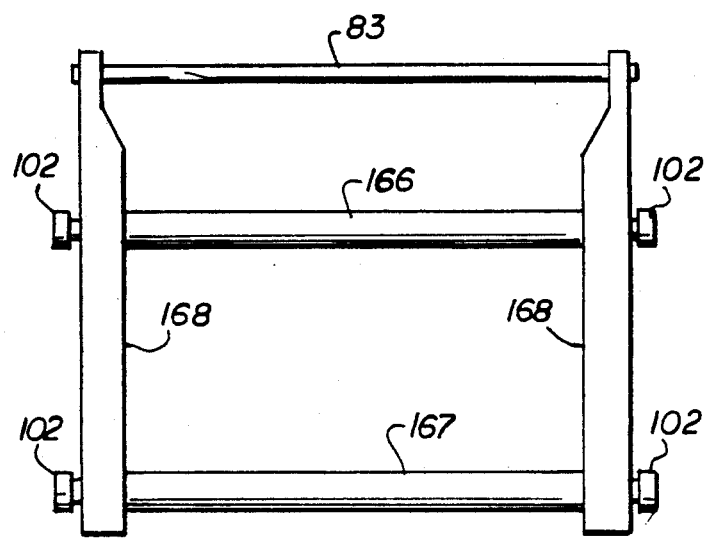
FIG. 21 is a schematic front elevational view of the frame of the bin subsection.
Figure 22:
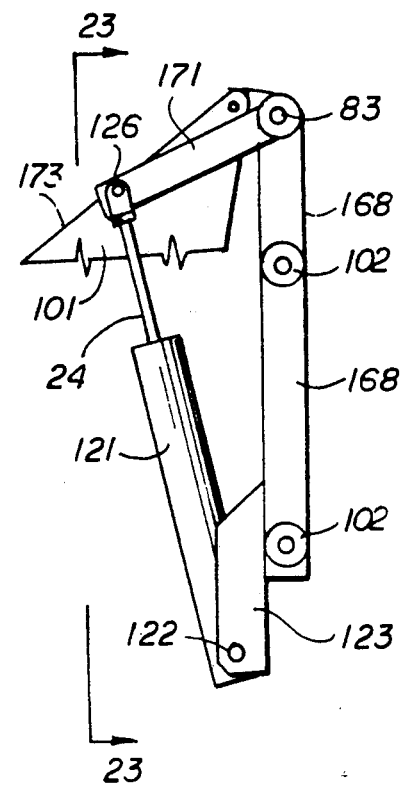
FIG. 22 is a side elevational view of the structure of FIG. 21 with parts added.
Figure 23:
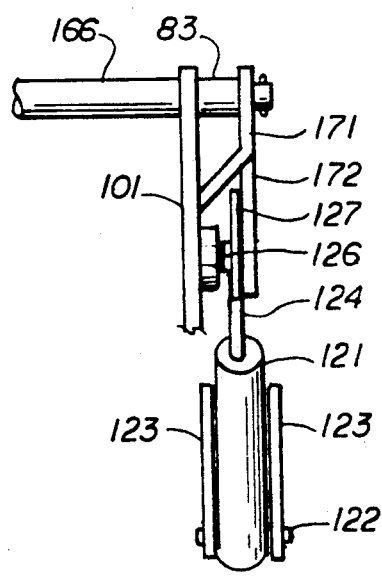
FIG. 23 is a fragmentary view taken substantially along line 23—23 of FIG. 22.
Figure 24:
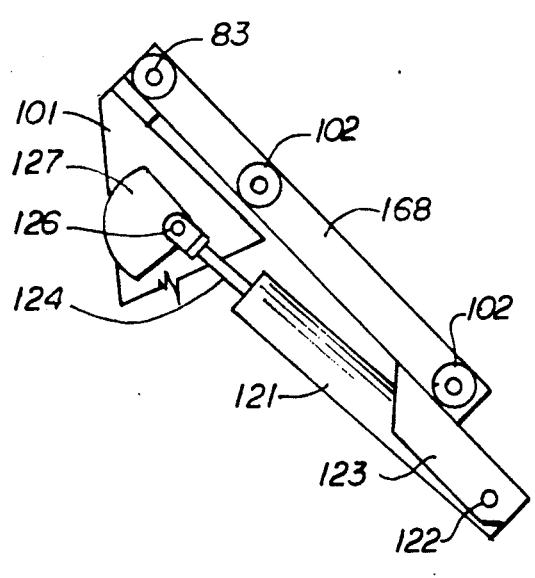
FIG. 24 is a side elevational view of the structure of FIG. 23.

Directing attention to FIG. 17, during transport it is desirable that the bin subsection 84 be tucked under the body. This is accomplished by the rollers 102 moving down into the inward slanted portions 82 of the channels 81. To prevent the bin subsection 84 from pivoting outward during transportation, a pocket 136 is formed in the bin subsection and a rod 137 extends horizontally longitudinally across the pocket. Hook 138 is fixed to horizontal longitudinal support 141 on the lower end of channel section 82. Hook 138 has a latch surface 139 disposed at an angle approximately equal to that of the channel 82 to the horizontal. Any tendency of the bin subsection 84 to pivot outward about its pivot access 83 would occur in the direction of the arrow A and this outward movement is thus prevented by the latch surface 139. On the other hand, when the bin subsection 84 is lifted by actuation of the lift cylinder 88, the bin subsection 84 moves upward at a slant as shown by arrow B parallel to channel section 82. Thus the rod 137 clears the latch surface 139. It will be understood that although in FIG. 17 the front 105 is shown open, during transport it is closed. However, the bin compartments may be loaded with the front 105 pulled outward as shown in FIG. 17.

COLLECTION CARTS

Refuse may be loaded into the bin compartments with the bin subsection 84 in the positions shown in FIGS. 7 and 17. However, refuse is frequently collected in carts 146 having wheels 147 having an outward extending rim 148 at the top and closed by a lid 150. In accordance with the present invention a bracket 149 is attached to the cart near its bottom for a purpose which hereinafter appears.

A reinforcement 151 extends across the upper edge of front 105, being held spaced outward from front 105 by fingers 153 with a notch 152 behind the reinforcement 151. Directing attention now to FIG. 12, the downward turned rim 148 of cart 146 hooks over the reinforcement 151 and the down turned edges of the rim 148 as well fit into the notch 152. When the bin sub-structure moves up from the position of FIG. 7 to the position of FIG. 7A, the upper end of the cart 146 is raised off the ground.

Figure 15:
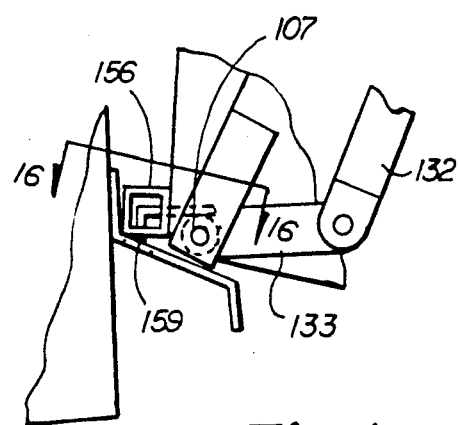
FIG. 15 is a fragmentary elevational view showing commencement of the latching of the cart to the bottom of the bin.
Figure 13:
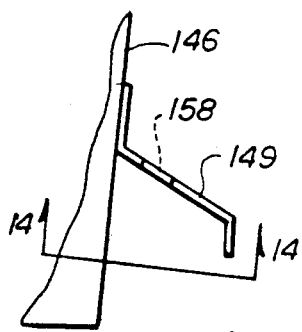
FIG. 13 is a fragmentary enlarged view of the cart showing the latching hook thereof.
Figure 15A:
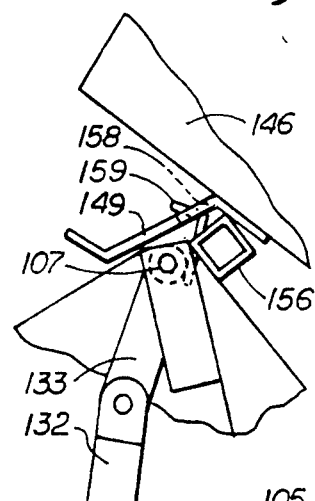
FIG. 15A is a fragmentary elevational view showing how the cart is latched to the bin during dumping.
Figure 14:
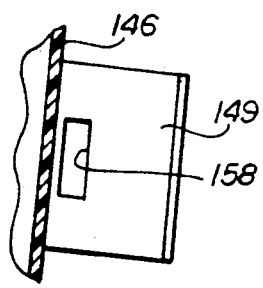
FIG. 14 is a fragmentary sectional view taken substantially along the line 14—14 of FIG. 13.
Figure 16:
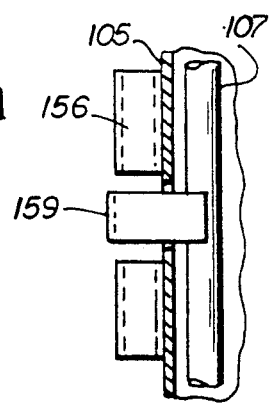
FIG. 16 is a fragmentary sectional view taken substantially along the line 16—16 of FIG. 15.

For each bin compartment there is a pair of spaced stops 156 positioned near the bottom edge of front 105. It will be noted with reference to FIG. 14 that there is a hole 158 formed in bracket 149. As shown in FIGS. 15 and 15A, hook 159 is fixed for pivotal movement with the pivot shaft 107 and, when the shaft 107 is rotated counterclockwise, the hook 159 fits through the hole 158, locking the lower end of the cart 146 to the bin subsection 84.

Figure 9:
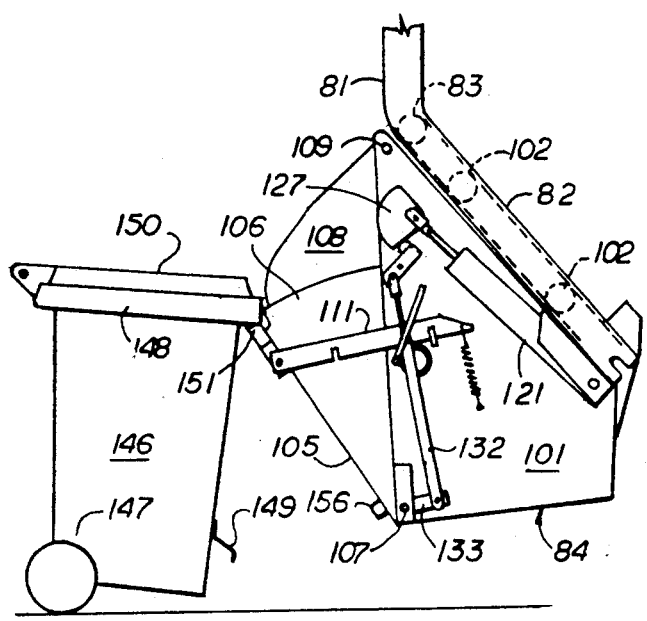
FIG. 9 is a view similar to FIG. 8 showing a collection cart hooked onto the lip of the outside of the bin.
Figure 10:
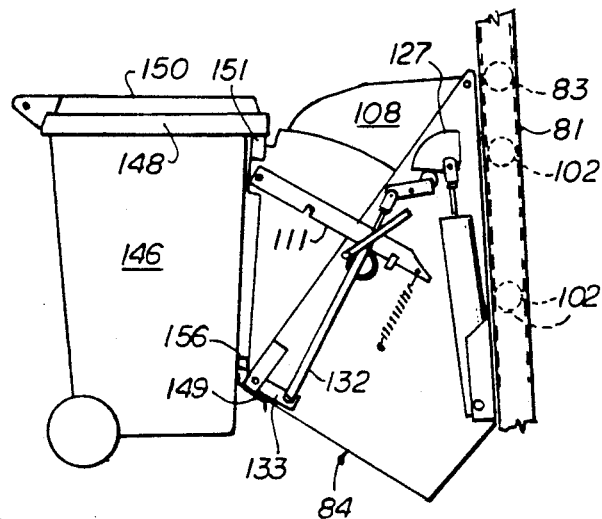
FIG. 10 is a side elevational view showing the bin partially elevated with the cart latched thereto.
Figure 11:
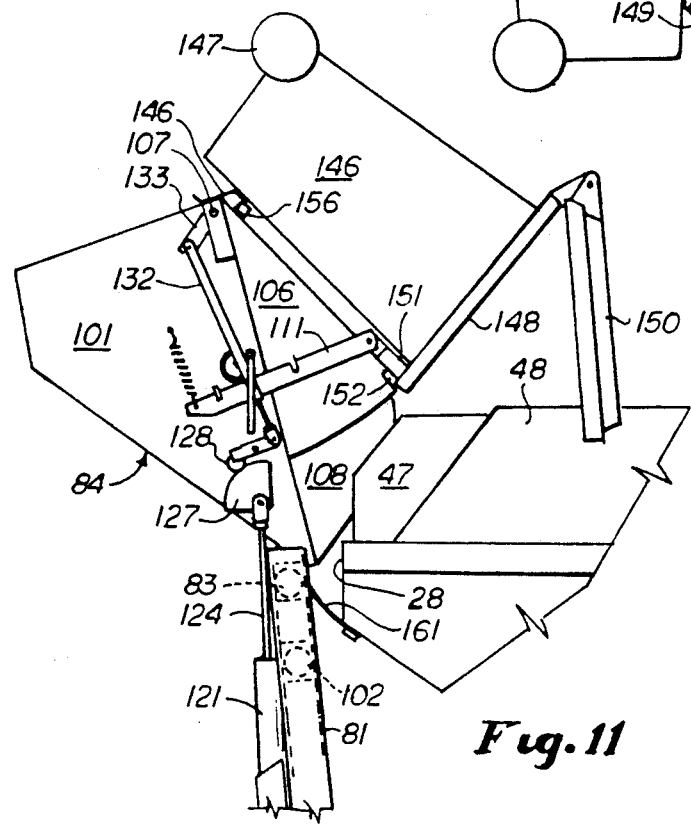
FIG. 11 is a side elevational view showing the bin and cart in dumping position.
Figure 12:
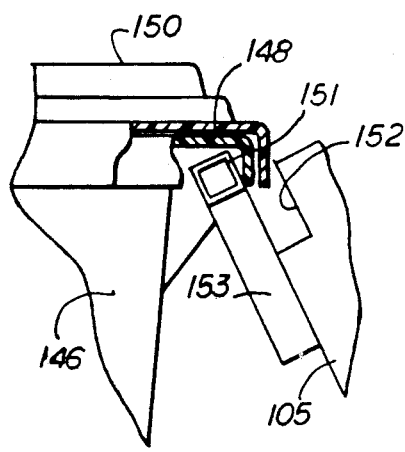
FIG. 12 is an enlarged fragmentary view showing the rim of a cart hooked over a portion of the bin.

Thus when carts 146 are to be dumped, the first operation as shown in FIG. 9 is to hook the rims 148 over the reinforcement 151 as shown in FIG. 12. When the bin subsection 84 approaches its dump position as shown in FIG. 11, the cam follower 128 moves around from the underside of the cam 127 to its curved side and this causes the link 132 to pivot the lever 133 upward, thereby turning the pivot shaft 107 counterclockwise causing the hook 159 to enter the hole 158 and hold the cart 146 in position while it is being dumped.

Directing attention to FIG. 11 it will be seen that a boot 161 such as a strip of flexible belting is fixed to the side 28. Boot 161 bridges the gap between side 28 and pivot shaft 83 and prevents debris from falling between the bin subsection 84 and the side 28.

OPERATION

At the commencement of operation, both cylinders 88 and 121 are in retracted position, front 105 is closed and the canvas paper lid 66 is closed. Hook 138 engages rod 137 preventing the bin subsection 84 from pivoting outward as the vehicle progresses along the highway.

When the vehicle reaches it loading destination, the paper lid 66 is opened by raising handle 69. Latch release lever 116 is pulled outward causing the latch bar 111 to be lifted so that the latch 113 is out of engagement with the outer notch 112. The operator then pulls the front 105 outward to the position of FIG. 8. It will be understood that a mechanical or hydraulic means may be used to pull the front 105 out. Outward movement of front 105 causes the leaves 106 and 108 to fold out from their retracted position to their operative position shown in FIG. 8. Latch 113 seats in the inner notch 112.

Assuming that carts 146 are not employed, different kinds of refuse are loaded into the three compartments of the bin subsection 84. When a bin compartment is fully loaded, the operator actuates the hydraulic valve which energizes cylinder 88. Rollers 102 roll upwardly outwardly along the slanted stretch 82 and then upward into the vertical stretch of the channels 81. When the bin subsection 84 reaches the top of channels 81, because the valve controlling cylinder 88 is sequential, cylinder 121 is energized causing the bin subsection 84 to pivot about pivot shaft 83. Refuse in the bin compartments then dumps into the chutes at the top of the body 22 and falls by gravity into the proper compartments 57, 59 and 73. The control valve is then reversed, causing the cylinder 121 to contract, returning the bin subsection to its upright position. Thereupon the cylinder 88 retracts causing the bin to move down the channels 81 and into the slanted section 82 with the hook 138 engaging the rod 137. The operator then actuates the lever 116 to raise the latch lever 111 and either manually or by mechanical or by hydraulic means (not shown) closes the front 105. The width of the truck body is not extended over highway limits because of the fact that the subsection 84 is tucked under the body and the front 105 is closed. Handle 69 is lowered to close the lid 66.

The loading process may be continued as frequently as desired. From time to time the cylinder 24 is energized to pivot the body 22 so that the refuse slides rearward.

At the conclusion of the route, the body 22 is tilted and the doors 44 are opened to expose compartment 59 and dump the contents. Gates 34 are opened to empty the compartments 57 and 73, the baffles 37 and 38 being dropped to direct refuse toward the side.

When carts 146 are used, their rims 148 are hooked onto the reinforcement 151. When the bin is raised to its upper position and the cylinder 121 is actuated, the hooks 159 fit through the holes 158 in the brackets 149 for each of the carts, preventing them from falling when they reach the dumping position. When the operation is reversed, as the carts 146 are returned to down position, the hooks 159 disengage the brackets 149.

LOADING BOTH SIDES

The truck is shown having loading facilities on the right side only. However, a lift mechanism similar to that illustrated heretofore may be installed on the left side so that mechanical loading may be conducted on either side of the vehicle.

For such purposes, the chute design is somewhat modified as best shown in FIGS. 2A through FIGS. 5A. Directing attention first to FIG. 2A, a slanted ramp 181 is placed over the top of inset 39a which is provided for installation of the lift equipment on the left side of the vehicle.

Directing attention to FIG. 3A, a slanted ramp 182 is installed over the inset 39a as well as in the space between the latter and partition 41a.

Directing attention to FIG. 4A, a slanted ramp 183 is placed over the top of inset 139.

Again directing attention to FIGS. 2A through 5A, if debris is loaded from either side of the truck between the extensions 47a and 49a it slides down either the ramp 181 or chute bottom 56a into the third compartment 57a. As shown in FIG. 3A, if debris is loaded between the extensions 49a and 52a from either side it slides down either the chute bottom 71a or the ramp 183 into the compartment 73a.

In other respects the structural elements shown in FIGS. 2A through 5A resemble those of the preceding modification and the same reference numerals followed by the subscript are used to designate corresponding parts.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A truck for separate handling or segregated refuse comprising
    a body having a bottom, a first side, a second side opposite said first side, a front, a rear, and a top,
    at least one vertical, longitudinal partition running through said body from said front toward said rear dividing said body into first and second longitudinal compartments spaced laterally relative to each other,
    said top having a first and a second opening, said openings being spaced longitudinally relative to each other,
    first and second chute-forming means for said first and second openings, respectively, said chute-forming means being spaced longitudinally relative to each other,
    a first chute bottom for said first chute-forming means slanting laterally from said first side downwardly into said first compartment, said first chute-forming means having no communication with said second compartment,
    a second chute bottom for said second chute-forming means slanting laterally from said first side downwardly into said second compartment, said second chute-forming means having no communication with said first compartment,
    and discharge means adjacent said rear for discharging said compartments separately.

2. A truck according to claim 1 which further comprises for at least one said opening a retractable lid for selectively closing off said opening and retraction means for advancing and retracting said lid to close and open said opening.

3. A truck according to claim 1 which further comprises a chassis, means pivotally mounting said body to said chassis about a horizontal transverse pivot axis adjacent said back and means for tilting said body about said pivot axis.

4. A truck according to claim 3 in which said discharge means for the other said compartment comprises a vertically reciprocable gate in one said side adjacent said rear and means for opening said gate.

5. A truck according to claim 4 in which said partition angles outward toward the rear of said gate to direct refuse sliding backward in said one compartment out said gate when said body is tilted.

6. A truck according to claim 4 which further comprises third chute forming means on the exterior of said body to direct refuse discharged from said gate away from said truck.

7. A truck according to claim 4 in which said discharge means for the other said compartment comprises a vertically hinged door in said back.

8. A truck according to claim 1 in which said chute forming means extends above said top.

9. A truck according to claim 1 which further comprises a hoist located on one said side aligned with said chute-forming means, said hoist comprising
    a bin divided by at least one bin partition into bin compartments corresponding to said openings and
    lift means for lifting said bin from ground level to the top of said one side and then tilting said bin inwardly to dump refuse in each said bin compartment into one of said openings.

10. A truck according to claim 9 for use with a cart comprising cooperating detachable latch means on said bin and said cart to secure the outside of said cart to said bin whereby when said bin is lifted and tilted said cart is lifted and tilted.

11. A truck according to claim 1 in which said first chute-forming means further comprises a third chute bottom slanting laterally from said second side downwardly into said first compartment and said second chute-forming means further comprises a fourth chute bottom slanting laterally from said second side downwardly into said second compartment,
    whereby said body may be loaded from either side.

12. A truck for separate handling of segregated refuse comprising
    a body having a bottom, sides, front, rear, and top,
    at least one vertical, longitudinal partition running through said body from said front toward the rear dividing said body into at least two longitudinal compartments,
    said top having separate openings, each communicating with one said compartment,
    chute-forming means for each said opening having a chute bottom slanted from one said side toward one said opening,
    and discharge means adjacent said rear for discharging said compartments separately,
    said openings being located at the forward end of said top, a first said opening being spaced ahead of a second said opening and said chute-forming means being divided into at least two sections by a transverse chute partition,
    a hoist located on one said side aligned with said chute-forming means, said hoist comprising
    a bin divided by at least one bin partition into bin compartments corresponding to said openings and lift means for lifting said bin from ground level to the top of said one side and then tilting said bin inwardly to dump refuse in each said bin compartment into one of said openings, said means for lifting comprising guide means extending from said top toward said bottom and then inwardly under said body, and follower means on said bin engaging said guide means so that when said bin is in lowered position it is tucked under said body.

13. A truck according to claim 12 in which said bin comprises a bin back, a bin bottom, bin ends, and a bin front hinged to the lower outer edge of said bottom, whereby said front may be pivoted outward to open said bin.

14. A truck according to claim 13 in which said bin has end leaves parallel and slidable relative to said bin ends, said end leaves being fixed to said bin front, said end leaves contacting said bin ends and closing off the gap between said bin end and said bin front when said front is pivotted outward.

15. A truck according to claim 14 which further comprises second leaves contacting said end leaves and pivotted to the upper outer edge of said bin ends and means for pivoting said second leaves outward when said end leaves are pivotted outward.

16. A truck according to claim 15 which further comprises second leaves contacting said end leaves and pivotted to the upper outer edge of said bin ends and means for pivoting said second leaves outward when said end leaves are pivotted outward.

17. A truck according to claim 12 which further comprises pivot means pivoting said bin relative to said guide means whereby when said lift means lifts said bin to the top of said truck said bin may be pivotted inward to drop the contents of said bin into said chute-forming means.

18. A truck according to claim 17 which further comprises cooperating means on said bin and said guide means to secure said bin against outward pivotal movement of said bin relative to said pivot means when said bin is in lowered position.

19. A truck according to claim 17 which further comprises dump means to pivot said bin inwardly about said pivot means.

20. A refuse truck comprising a body having a bottom, sides, front, rear and top, said top having an opening and a hoist located on one side aligned with said opening, said hoist comprising a bin, lift means for lifting said bin from ground level to adjacent said top and then tilting said bin inwardly to dump refuse into said opening, said lift means comprising guide means for said bin extending from said top to adjacent said bottom and then inwardly under said bottom and follower means on said bin engaging said guide means so that said bin is tucked under said body when in fully lowered position.

21. A truck according to claim 20 in which said guide means comprises opposed inward facing channels and said follower means comprises a frame having rollers fitting into said channels, said bin being carried by said frame.

22. A truck according to claim 21 which further comprises a pivot shaft on said frame, said bin being fixed to said pivot shaft and dump means between said frame and said pivot shaft to oscillate said pivot shaft about its axis and thereby tilt said bin relative to said frame.

23. A truck according to claim 22 which further comprises a cooperating means on said bin and said guide means to secure said bin against outward pivotal movement of said bin relative to said pivot means when said bin is in lowered position.

24. A truck according to claim 20 in which said hoist further comprises a vertical cylinder having a rod, a crosshead connected to said rod mounted on said side for vertical reciprocation and a chain drive from said crosshead to said frame.

25. A truck according to claim 20 in which said bin comprises a bin back, a bin bottom, bin ends, and a bin front hinged to the lower outer edge of said bottom, whereby said front may be pivoted outward to open said bin.

26. A truck according to claim 25 in which said bin has end leaves parallel and slidable relative to said bin ends, said end leaves being fixed to said bin front, said end leaves contacting said bin ends and closing off the gap between said bin end and said bin front when said front is pivotted outward.

27. A truck according to claim 20 for use with a cart comprising cooperating means on said bin and said cart to secure said cart to said bin whereby when said bin is lifted and tilted said cart is lifted and tilted.

* * * * *